United States Patent
Winograd et al.

[11] Patent Number: 6,145,081
[45] Date of Patent: Nov. 7, 2000

[54] METHOD AND APPARATUS FOR PREVENTING REMOVAL OF EMBEDDED INFORMATION IN COVER SIGNALS

[75] Inventors: Joseph M. Winograd, Cambridge; Rade Petrovic, Wilmington; Eric Metois, Somerville; Kanaan Jemili, Woburn, all of Mass.

[73] Assignee: Verance Corporation, San Diego, Calif.

[21] Appl. No.: 09/017,145

[22] Filed: Feb. 2, 1998

[51] Int. Cl.$^7$ ...................................................... G06F 12/14
[52] U.S. Cl. .......................... 713/200; 382/306; 380/201; 380/205; 380/239; 705/57; 705/62; 713/176; 348/473
[58] Field of Search .................................. 380/23, 59, 5, 380/19; 713/176, 177, 179; 382/306; 348/334; 386/95, 96, 104

[56] References Cited

U.S. PATENT DOCUMENTS

| | | | |
|---|---|---|---|
| 4,969,041 | 11/1990 | O'Grady et al. | 358/142 |
| 5,073,925 | 12/1991 | Nagata et al. | 380/3 |
| 5,251,041 | 10/1993 | Young et al. | 358/310 |
| 5,315,098 | 5/1994 | Tow | 235/494 |
| 5,450,490 | 9/1995 | Jensen et al. | 380/6 |
| 5,664,018 | 9/1997 | Leighton | 380/54 |
| 5,809,139 | 9/1998 | Girod et al. | 380/5 |
| 5,859,920 | 1/1999 | Daly et al. | 358/456 |

FOREIGN PATENT DOCUMENTS 0298691  1/1989  European Pat. Off. .
0766468  4/1997  European Pat. Off. .

OTHER PUBLICATIONS

"A Psychovisual Approach to Digital Picture Watermarking", Delaigle, Vleeschouwer, Macq, Laboratorie de Telecommunications et Teledetection, Universite Catholique de Louvain, from: Signal Processing, 66(3), pp. 319–335, May 1998.

Ruanaidh, J.J.K. O, et al., "Phase Watermarking of Digital Images" Proceedings of the International Conference on Image Processing (IC Lausanne), IEEE, vol. 3, Sep. 16–19, 1996, pp. 239–242.

*Primary Examiner*—Tod R. Swann
*Assistant Examiner*—Paul E. Callahan
*Attorney, Agent, or Firm*—Rothwell, Figg, Ernst & Kurz

[57] ABSTRACT

Apparatus and methods are provided for embedding watermark information into a cover signal, such as an audio signal, video signal, or still image signal, in a manner that prevents the watermark information from being removed without degrading the quality of the cover signal. This is accomplished by subjecting the cover signal to a phase modulation prior to being embedded with the watermark information, wherein the amount or degree of phase modulation is changed at least for each different watermark to be embedded in a particular instance or copy of the cover signal. As such, if two copies of the same cover signal, each containing a different watermark, are averaged or combined in an attempt to obliterate the watermark information, the cover signal will be subjected to phase cancellation, rendering any illicit copy of such signal so derived to be valueless.

19 Claims, 1 Drawing Sheet

METHOD AND APPARATUS FOR PREVENTING REMOVAL OF EMBEDDED INFORMATION IN COVER SIGNALS

BACKGROUND OF THE INVENTION

1. Field of the Invention

This invention generally relates to apparatus and methods for encoding or embedding information in cover signals, such as audio, video and data signals, either transmitted by radio wave transmission or wired transmission, or stored in a recording medium such as optical or magnetic disks, magnetic tape, or solid state memory. In particular, the present invention relates to methods and apparatus for preventing the embedded information from being removed or obliterated from the cover signal.

2. Background and Description of Related Art

With the advent of the Internet and improvements in digital technology, it is becoming possible to make unlimited copies of copyrighted content such as audio, video, still images and the like, without degradation of the original content. For example, there is currently a large market for audio software products, such as musical recordings. One of the problems in this market is the ease of copying such products without paying those who produce them. This problem is becoming particularly troublesome with the advent of recording techniques, such as digital audio tape (DAT), which make it possible for copies to be of very high quality. It is thus desirable to be able to prevent the unauthorized copying of audio recordings, including the unauthorized copying of audio works broadcast over the airwaves or made available on the Internet.

Recently, a significant amount of attention has been given to various methods for digital "watermarking" of copyright protected program material. As opposed to encryption, in which the content of the program itself is subjected to scrambling or encoding, such that without the correct decoder equipment, the content cannot be reproduced, watermarking relates to the insertion into program material such as audio or video signals digital information identifying the copyright holder and/or the purchaser of a particular copy of the audio or video program in a manner which is imperceptible to the listener or observer. The watermarking information is thus hidden from the ordinary recipient of the program, and can be detected only by use of appropriate apparatus or knowledge of the watermarking parameters. Such watermarking is also known as steganography. Literally meaning "covered writing" from the Greek, steganography has been defined as the art and science of communicating in a way which hides the existence of the communication.

Various prior art methods of encoding auxiliary hidden information onto a source or cover signal are known in the art. See, e.g., U.S. Pat. Nos. 5,319,735; 5,450,490; 5,613,004; 5,687,236; 5,636,292; and 5,574,962.

In the area of copyright enforcement, the watermark information may contain the identity of the purchaser of a particular copy of the audio, video, or other program material. Thus, each copy of the same audio or video program would contain a different watermark to the extent that such copy is purchased by a different entity.

The value of any watermarking technique lies in its resistance to removal from the cover signal, without also destroying the content of the audio or video program in which it resides. In this regard, there exists a problem in the art known as a collusion attack. A collusion attack results when two or more copies of a program signal with different watermarks are combined in some manner, such as averaging or interleaving, whereby the watermark information is obliterated, while the quality of the content information is preserved. Because the program content is identical, averaging the signal will produce the same content. However, the watermarking information would be destroyed because this information would be different for each copy of the cover signal, so that averaging of the copies would in effect "erase" the watermark.

Prior techniques for defending against such collusion attacks are known in the art. Such techniques have focused on adding redundancy to watermarking codes to obtain similarity in at least a portion of the watermark information in different copies. For example, U.S. Pat. No. 5,664,018 to Leighton discloses a method wherein a secret "baseline" watermark is created from a digital string of the work to be marked, which is then used to create a set of modified watermarks, each having a certain relationship to the baseline watermark. Each modified watermark is then inserted into a copy of the work to create a watermarked copy of the work. If any small subset of the modified watermarks are averaged, at least one of the watermarks will remain.

Several significant disadvantages exist in the known methods for preventing watermark removal. First, use of data redundancy imposes a large penalty on the required length of the watermark data with respect to the actual embedded information. Second, such anti-collusion methods actually cannot prevent removal of watermarks if a sufficiently large number of copies is used in the averaging. Collusion attacks using a sufficient number of different copies will completely remove the watermarks without causing any degradation of the cover signal content. As such, there exists a need in the art for improvement in methods and corresponding apparatus for preventing the removal of watermark information from cover signals.

SUMMARY OF THE INVENTION

The present invention solves the abovementioned problems in the art and provides a method and apparatus for embedding watermark information into a cover signal such that any attempt to remove the embedded watermark information will cause significant degradation of the cover signal itself, rendering it commercially useless. The method and apparatus according to the present invention does not require any redundancy in watermarking codes or information, and is applicable to any method or technique for adding or embedding watermark information into a host or cover signal, whether it be an audio signal, video signal or still image signal.

In particular, according to one aspect the present invention provides a method for embedding watermark information into a cover signal, comprising the steps of selecting values of predefined phase modulation parameters for the cover signal, modulating the phase characteristics of the cover signal according to the selected phase modulation parameter values to obtain a phase-modulated cover signal, and embedding the watermark information into the phase-modulated cover signal to obtain a stego signal, wherein the phase modulation parameter values are selected such that combining any two or more instances of the stego signal containing different watermark information will produce significant distortion with respect to the cover signal as a result of phase misalignment.

According to another aspect, the present invention provides apparatus for embedding watermark information into a cover signal, comprising a phase modulation parameter generator for providing values of predefined phase modulation parameters, a phase modulator for modulating the phase characteristics of the cover signal in accordance with the phase modulation parameter values to produce a phase-modulated cover signal, and a watermark information embeddor for embedding watermark information into the phase-modulated cover signal to obtain a stego signal.

BRIEF DESCRIPTION OF THE DRAWINGS

These and other aspects of the present invention will become more fully understood from the following detailed description of the preferred embodiments in conjunction with the accompanying drawings, in which.

DETAILED DESCRIPTION OF THE PREFERRED EMBODIMENTS

The present invention is directed to a method and apparatus for embedding watermarking information into a cover signal, such as a video signal, an audio signal, or a still image signal (such as a JPEG, GIF, TIF or BMP signal), in a manner such that any attempt to remove the watermarking by combining together two or more copies of the same cover signal but containing different watermarks, will result in significant degradation of the cover signal by introducing undesired artifacts into the resultant signal.

Figure 1:
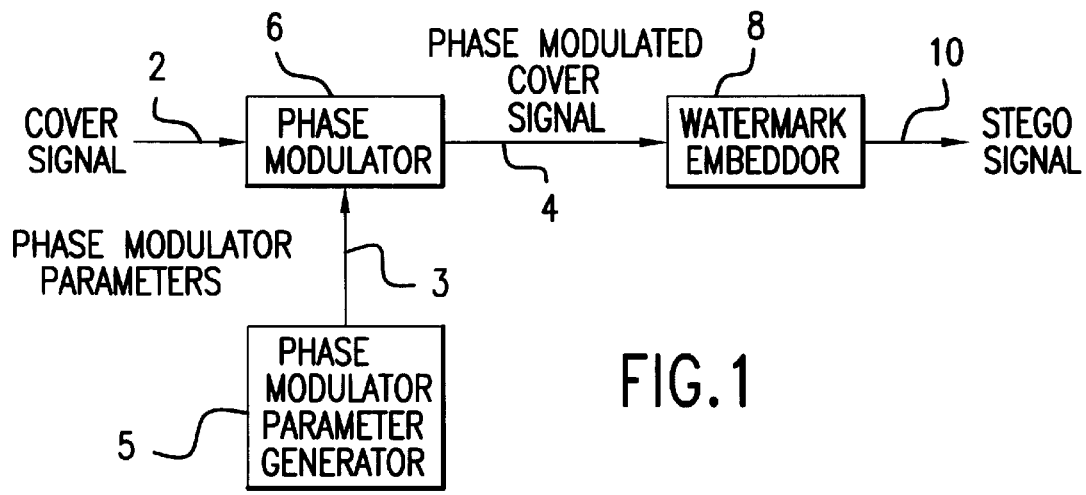
FIG. 1 is a block diagram illustrating one preferred embodiment of an apparatus for embedding watermarking information into a cover signal according to the present invention.

As shown in FIG. 1, according to one preferred embodiment of the invention, a phase modulator 6 receives a cover signal 2 (such as an audio signal, video signal, still image signal, or multimedia signal) and modulates the phase characteristics of the cover signal 2 in accordance with pre-defined variable modulation parameters 3 generated by a phase modulator parameter generator 5. The resultant phase-modulated cover signal 4 is then applied to a watermark embeddor 8, for embedding into the phase-modulated cover signal 4 appropriate watermarking information, to obtain a stego signal 10. Stego signal 10 thus contains the same content as cover signal 2, but includes watermark information. The specific watermarking process utilized by watermark embeddor 8 is not material to the present invention, and any known method of embedding watermark information, including the methods mentioned above, could be used in the implementation of embeddor 8.

The phase modulator 6, modulation parameter generator 5, and watermark embeddor 8 can be implemented either as software on a general programmable data processor, as an analog or digital or mixed-signal integrated circuit, as a discrete component electronic circuit, or as a combination of such devices.

The phase-modulated cover signal 4 is produced by the phase modulator 6 by altering the phase of the cover signal components either in a fixed or time-varying manner, and in accordance with modulation parameters provided by parameter generator 5. A number of known techniques for altering the phase structure of a signal may be used; however, two specific examples will be described below with reference to FIGS. 2 and 3 for purposes of illustration. For any such technique, for any fixed modulation parameter values, the phase modulation can be either linear or nonlinear with respect to frequency in the time dimension and/or one or more spatial dimensions. While any type of phase modulator can be used to implement the phase modulator 6, it must the following requirements:

1) the phase modulator 6 should cause minimal disturbance with respect to the perception of the cover signal 2, be it sound, video or still image;

2) any averaging between two or more phase-modulated versions of the cover signal should lead to noticeable distortion of the cover signal with respect to its perception as sound, video or a still image.

The phase modulation parameters 3 are changed at a minimum each time a new copy of a specific cover signal 2 is to be watermarked with different watermark data. This is required so that different watermarked copies of the same cover signal will undergo a destructive phase cancellation if combined in an attempt to remove the watermark data. To prevent the phase modulation from being reversed during a collusion attack, the phase modulation parameters 3 may be changed during the phase modulation of a particular cover signal, either randomly or systematically, to thereby obtain a signal phase modulation that varies either in time, space, or in some other signal dimension.

Further, it is also possible for the phase modulation parameters to be selected in such a way that in addition to meeting the above requirements, they also serve to embed additional hidden information which may be extracted from the stego signal alone, the stego signal in comparison with the cover signal, or from a colluded signal obtained from multiple copies of stego signals derived from the same cover signal but with different watermark data.

FIRST EXAMPLE

Figure 2:
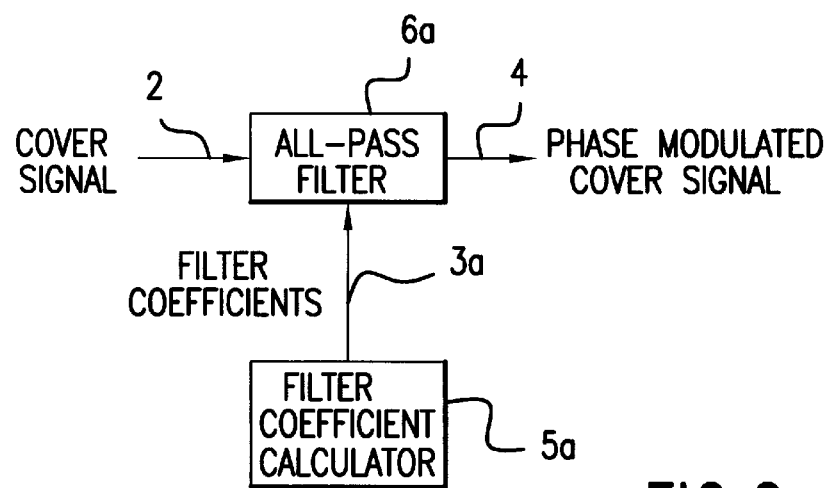
FIG. 2 is a block diagram illustrating one preferred embodiment of the phase modulator 6 and phase modulator parameter generator 5 of FIG. 1.

Referring to FIG. 2, a first representative embodiment of the phase modulator and modulation parameter generator will be described. In this embodiment, the cover signal 2 is assumed to be one-dimensional and uniformly sampled in time. The phase modulator is implemented in this embodiment by a digital all-pass filter 6a. Such digital all-pass filters are generally known in the art and for this reason a detailed description of such filters will not be given here.

The phase modulation parameter generator is implemented as a filter coefficient generator 5a. The number of poles, or order of the all-pass filter is arbitrary. In this example, the all-pass filter 6a is assumed to be a single second-order infinite impulse response (IIR) filter. This example further assumes a digitized cover signal 2, but a corresponding analog domain embodiment is also encompassed by the invention and can be readily implemented by those skilled in the art based on the discussion herein.

The cover signal 2 is inputted to the IIR filter 6a, which also receives time-varying filter coefficients from coefficient calculator 5a. The difference equation describing the operation of the filter 6a is expressed as:

$$y(n) = \lambda_n(x(n) + a_n x(n-1) + b_n x(n-2)) + c_n y(n-1) + d_n y(n-2) \quad (1)$$

where x(n) is the nth sample of the cover signal 2, y(n) is the nth sample of the phase-modulated cover signal 4, and $a_n$, $b_n$, $c_n$, $d_n$, $\lambda_n$, are time varying filter coefficients 3a constituting the modulation parameters. The filter coefficients can be updated for each output sample of the filter 6a by the coefficient calculator 5a. A useful method for obtaining appropriate values for the coefficients is to use desired values of the poles' magnitude $\alpha(n)$ and phase $\phi(n)$ at the nth instant, and can be obtained using the following relationships:

$$a_n = -\frac{2\cos\varphi(n)}{\alpha(n)} \quad (2)$$

$$b_n = \frac{1}{\alpha^2(n)} \quad (3)$$

$$c_n = 2\alpha(n)\cos\varphi(n) \quad (4)$$

$$d_n = -\alpha^2(n) \quad (5)$$

$$\lambda_n = \frac{|1 - 2\alpha(n)\cos\varphi(n) + \alpha^2(n)|}{\left|1 - \frac{2\cos\varphi(n)}{\alpha(n)} + \frac{1}{\alpha^2(n)}\right|} \quad (6)$$

Systems for which the time variations of the poles' magnitude and phase follow slow sweeps of chosen magnitude and phase ranges have been implemented successfully and found to comply with the requirements given above. The initial conditions, rate and direction of change of such sweeps are systematically randomized to ensure a difference between results of distinct phase modulations applied to the same cover signal. Satisfactory results have been obtained on audio signals when using the following choices for magnitude and phase ranges and the speed of variation of those parameters:

$$\varphi(n) \in \left[\frac{1000\pi}{f_s}, \frac{8000\pi}{f_s}\right] \quad (7)$$

$$\alpha(n) \in [0.8, 0.9] \quad (8)$$

$$|\alpha(n) - \alpha(n-1)| < \frac{0.1}{f_s} \quad (9)$$

$$|\varphi(n) - \varphi(n-1)| < \frac{4000\pi}{f_s^2} \quad (10)$$

where $f_s$ refers to the sampling frequency of the cover signal in cycles per second (hertz).

SECOND EXAMPLE

Figure 3:
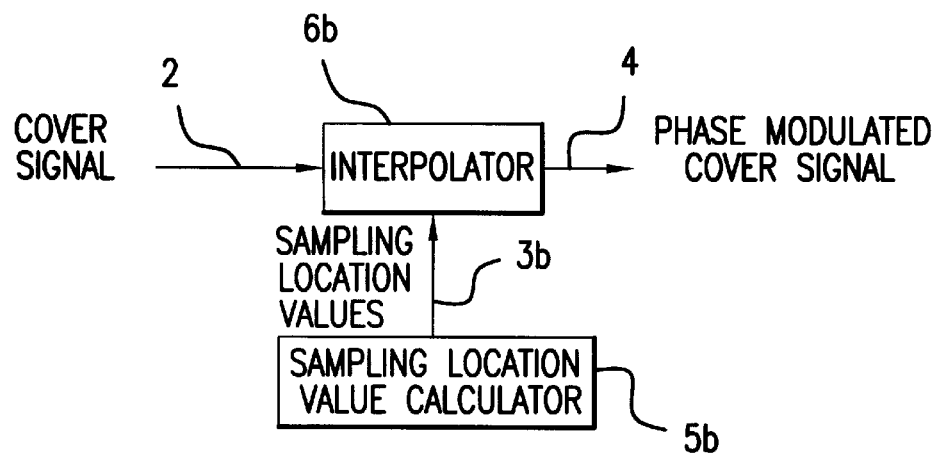
FIG. 3 is a block diagram illustrating an alternate preferred embodiment of the phase modulator 6 and phase modulator parameter generator 5 of FIG. 1.

Referring to FIG. 3, a second representative embodiment of the phase modulator and modulation parameter generator will be described. In this embodiment, the phase modulator 6 is implemented by a interpolator 6b, and the phase modulation parameter generator 5 is implemented by a sampling location value calculator 5b. The interpolator and sampling location value generator together produce a time-varying linear phase modulation which is essentially equivalent to non-uniform resampling of the original cover signal 2. In other words, this embodiment of the phase modulator and modulation parameter generator produces the effect of slightly speeding up or slowing down the cover signal 2 in a time-varying manner.

In this embodiment, cover signal 2 is assumed to be a discrete-time signal x(n), where n=0 corresponds to the beginning of the cover signal. The phase-modulated cover signal 4 is referred to as y(n), u(n) refers to the continuous-time sampling location for the nth output sample of the interpolator 6b, and sp(n) refers to the time-varying sampling interval which is provided to the sampling location value calculator 5b. Sampling location value calculator 5b produces continuous-time sampling location u(n) according to the following relationship with time-varying sampling interval sp(n):

$$u(n) = \sum_{k=0}^{n} sp(k) \quad (11)$$

Provided with sampling location u(n) and cover signal x(n), interpolator 6b produces phase-modulated cover signal 4 according to the following relationship:

$$y(n) = x_c(u(n)) = x_c\left(\sum_{k=0}^{n} sp(k)\right) \quad (12)$$

where $x_c(t)$ represents a continuous-time version of the discrete-time cover signal x(n). $x_c(t)$ is derived from x(n) through interpolation, which may be performed through polynomial interpolation, bandlimited interpolation or one of the many other interpolation techniques known in the art. Sampling interval sp(n) typically will vary slowly in time while confining its value within a narrow interval around 1. These conditions are illustrated by the following relationships:

$$|sp(n)-sp(n-1)| < \epsilon_1/f_s, \quad (13)$$

$$|sp(n)-1| < \epsilon_2 \quad (14)$$

where $f_s$ refers to the sampling frequency of the cover signal 2 in hertz, and $\epsilon_1$ and $\epsilon_2$ are constants chosen to avoid any perpetual discrepancy between cover signal x(n) and its phase-modulated version y(n).

Systems for which time variations of sp(n) are chosen to follow a slow sweep that satisfies equations (13) and (14) have been successfully implemented and found to produce the required properties discussed above, with $\epsilon_1$=0.01 Hz and $\epsilon_2$=0.01. The initial conditions, rate and direction of change of the sweep in such systems are systematically randomized to ensure a difference between the results of distinct phase modulations of the same cover signal.

The invention having been thus described, it will be apparent to those skilled in the art that the same may be varied in many ways without departing from the spirit and scope of the invention. Any and all such modifications as would be apparent to those skilled in the art are intended to be covered by the following claims.

What is claimed is:

1. A method for embedding watermark information into a cover signal, comprising the steps of:

selecting values of predefined phase modulation parameters for said cover signal;

modulating the phase of said cover signal according to said selected phase modulation parameter values to obtain a phase-modulated cover signal; and embedding said watermark information into said phase-modulated cover signal to obtain a stego signal; wherein said phase modulation parameter values are selected such that combining any two or more instances of said stego signal containing different watermark information will result in phase cancellation with respect to the combined signal.

2. A method as set forth in claim 1, wherein said phase modulation parameter values are time-varying during phase modulation of said cover signal.

3. A method as set forth in claim 1, wherein said phase modulation parameter values are randomly selected for each watermarking embedding operation on said cover signal.

4. A method as set forth in claim 1, wherein the step of modulating comprises passing said cover signal through an all-pass filter, and said phase modulation parameters are filter coefficients for said all-pass filter.

5. A method as set forth in claim 1, wherein the step of modulating comprises passing said cover signal through a sampling interpolator, and said phase modulation parameters are sampling location values with respect to said cover signal.

6. A method as set forth in claim 1, wherein said cover signal is an audio signal.

7. A method as set forth in claim 1, wherein said cover signal is a video signal.

8. Apparatus for embedding watermark information into a cover signal, comprising:

a phase modulation parameter generator for providing values of predefined phase modulation parameters;

a phase modulator for modulating the phase of said cover signal in accordance with said phase modulation parameter values to produce a phase-modulated cover signal; and a watermark information embeddor for embedding watermark information into said phase-modulated cover signal to obtain a stego signal.

9. Apparatus according to claim 8, wherein said phase modulator comprises an all-pass filter, and said phase modulation parameters comprise filter coefficients for said all-pass filter.

10. Apparatus according to claim 8, wherein said phase modulator comprises a sampling interpolator, and said phase modulation parameters comprise sampling location values with respect to said cover signal.

11. Apparatus according to claim 8, wherein said cover signal is an audio signal.

12. Apparatus according to claim 8, wherein said cover signal is a video signal.

13. Apparatus according to claim 8, wherein said phase modulation parameter values are time-varying during phase modulation of said cover signal.

14. Apparatus according to claim 8, wherein said phase modulation parameter values are randomly selected for each watermarking embedding operation on said cover signal.

15. A method for preventing removal of watermark information embedded into a cover signal, comprising the steps of:

modulating the phase of said cover signal by an amount which varies at least as a function of the content of said watermark information, to produce a phase-modulated cover signal; and embedding said watermark information into said phase-modulated cover signal.

16. A method as set forth in claim 15, wherein the step of modulating comprises passing said cover signal through an all-pass filter, and the amount of phase modulation is determined by filter coefficients for said all-pass filter which change with different watermark information.

17. A method as set forth in claim 15, wherein the step of modulating comprises passing said cover signal through a sampling interpolator, and the amount of phase modulation is determined by sampling location values with respect to said cover signal, which change with different watermark information.

18. A method as set forth in claim 15, wherein said cover signal is an audio signal.

19. A method as set forth in claim 15, wherein said cover signal is a video signal.

* * * * *